US005811661A

United States Patent [19]

Scheid et al.

[11] Patent Number: 5,811,661

[45] Date of Patent: Sep. 22, 1998

[54] METHOD FOR MONITORING THE FUNCTIONAL CAPABILITY OF AN EXHAUST GAS SENSOR-HEATER

[75] Inventors: Guenter Scheid, Pfakofen; Stefan Treinies, Regensburg; Manfred Wier, Wenzenbach, all of Germany

[73] Assignee: Siemens Aktiengesellschaft, Munich, Germany

[21] Appl. No.: 723,848

[22] Filed: Sep. 30, 1996

[30] Foreign Application Priority Data

Sep. 29, 1995 [DE] Germany ........................ 195 36 577.1

[51] Int. Cl.[6] ........................ G01N 37/00

[52] U.S. Cl. ........................ 73/23.32

[58] Field of Search ........................ 73/23.2, 23.31, 73/23.32; 123/688, 689, 690, 697

[56] References Cited

U.S. PATENT DOCUMENTS

| | | | |
|---|---|---|---|
| 5,090,387 | 2/1992 | Mayer et al. | 123/688 X |
| 5,454,259 | 10/1995 | Ishii et al. | 73/23.32 X |
| 5,462,040 | 10/1995 | Krebs et al. | 123/688 |

FOREIGN PATENT DOCUMENTS

| | | | |
|---|---|---|---|
| 0403615B1 | 12/1990 | European Pat. Off. . | |
| 3941995A1 | 6/1991 | Germany . | |
| 3-113355 | 5/1991 | Japan | 73/23.31 |
| 4-69565 | 3/1992 | Japan | 73/23.31 |

*Primary Examiner*—Hezron E. Williams
*Assistant Examiner*—Daniel S. Larkin
*Attorney, Agent, or Firm*—Herbert L. Lerner; Laurence A. Greenberg

[57] ABSTRACT

During lean operation of the internal combustion engine, preferably in relatively long-lasting overrunning shutoff phases, the output voltage of the sensor signal is regulated to a predetermined desired value via the heating control unit. If within the diagnosis period, fewer than a predeterminable number of monitoring results are within a tolerance range located around the desired value, then the heating circuit is classified as defective.

8 Claims, 2 Drawing Sheets

METHOD FOR MONITORING THE FUNCTIONAL CAPABILITY OF AN EXHAUST GAS SENSOR-HEATER

BACKGROUND OF THE INVENTION

1. Field of the Invention

The invention relates to a method for monitoring the functional capability of an exhaust gas sensor, heatable by a heater, in an internal combustion engine, by evaluating a sensor signal output by a lambda sensor.

In order to maintain a certain air/fuel mixture to be supplied to an internal combustion engine, it is known to supply a control unit with a controlling variable in the form of a signal from an exhaust gas sensor, a so-called lambda sensor, disposed in the exhaust system of the engine. The prerequisite for proper functioning of such a control unit is that the lambda sensor also function perfectly. In known exhaust sensors, whose output signal depends on the oxygen concentration in the exhaust gas and on the temperature of the sensitive film, functional readiness is not assured until beyond a certain temperature. To let the exhaust gas sensor reach its operating temperature as fast as possible, and then to enable the sensor temperature also to be kept at a predetermined value that is as constant as possible, an additional heater is provided, which not only assures heating of the exhaust sensor by the exhaust gases itself but also provides for rapid operational readiness of the sensor.

In order not to exceed the legally set limits for exhaust emissions and to meet the demands of environmental agencies, especially the California environmental agency known as CARB, the failure of exhaust-relevant parts must be detected and indicated. For instance, the current circuit of the lambda sensor heater must be monitored for correct current drop and voltage drop, and a malfunction must be indicated whenever at least one of the values for the current drop or voltage drop is outside the manufacturer-specified limits. The heating circuit of the lambda sensor is accordingly defective if the value for the heating output of the lambda sensor is no longer within a predetermined tolerance range that assures perfect function of the lambda sensor. If the engine has two rows of cylinders, with one exhaust line and one lambda sensor per row, then the monitoring must be done separately for each exhaust line.

In German Published, Non-Prosecuted Patent Application DE 39 41 995 A1, a system for monitoring the functional capability of a sensor heating arrangement is described that comprises a sensor heater, a device that supplies the necessary electrical power to the sensor heater, and the associated supply lines. The heating current for the sensor heater, in a series connected measuring resistor connected to the sensor heater, produces a measuring voltage that is compared with a further voltage output by a reference element. The latter element is at a temperature similar to the measuring resistor, or it receives a measured signal that corresponds to the temperature of the measuring resistor, and it outputs a voltage that has a temperature course similar to that of the measuring voltage. By comparing these two voltages, it is possible to draw a conclusion about the current flowing through the sensor heater and thus about the functional capability of the sensor heater.

In European Patent 0 403 615 B1, a method and an apparatus for detecting such a malfunction state of a lambda sensor that is heatable by a sensor heater are described. The sensor voltage is measured with the heater turned off; the heater is then turned on, and then the sensor voltage is measured with the heater on. If the measured values indicate that, reference to identical lambda values in each case, the voltage is greater with the heater on than with it off, a malfunction signal is output.

SUMMARY OF THE INVENTION

It is accordingly an object of the invention to provide a method for monitoring the functional capability of an exhaust sensor-heater, which overcomes the hereinafore-mentioned disadvantages of the heretofore-known methods of this general type and which makes it possible to detect defects in a heating circuit in a simple way and with high reliability.

By using the temperature dependence of the sensor signal, utilizing the heater that is necessary anyway for the operation of the exhaust sensor, it is possible to monitor the exhaust sensor for its functional readiness. The method according to the invention has the advantage in particular that to monitor the heater, no additional sensors or supply lines whatever are necessary, thus creating an inexpensive opportunity for diagnosis.

With the foregoing and other objects in view there is provided, in accordance with the invention, a method for monitoring the functional capability of a lambda sensor, heatable by a heater, for an internal combustion engine by evaluating a sensor signal output by the lambda sensor, comprising the steps of ascertaining an engine operating state in which it is assured that the lambda sensor will detect a lean mixture; detecting the sensor voltage output in that state, regulating by varying the heating output by means of the heater of the exhaust sensor, the sensor voltage to a predetermined desired diagnosis value; and classifying the heater of the lambda sensor as being defective if the sensor voltage after a predetermined diagnosis time is not within a tolerance range located around a desired diagnosis value.

According to another mode of the method, it further includes the step of ascertaining the operating state, the overrunning shutoff phase of the engine.

According to still another mode of the method, it further includes the step of ascertaining as the operating state, the secondary air injection into the exhaust pipe of the engine.

According to again another mode of the method, it further includes the step of sampling continuously within the diagnosis time, the sensor voltage of the lambda sensor in a selectable sampling pattern, and classifying the heater of the lambda sensor as defective if fewer than a predeterminable is number of samplings furnish a value that is within the tolerance range.

According to an additional mode of the method, it further includes the step of not-enabling the monitoring until the exhaust sensor detects a lean mixture composition for at least a predetermined period of time.

According to a further mode of the method, it includes the step of not-enabling the monitoring until the temperature of the exhaust sensor is within a predetermined temperature range.

According to a still further mode of the method, it includes the step of effecting the regulation of the sensor voltage to the desired diagnosis value by means of a heating controller that outputs a pulse-width modulated signal, whose duty cycle is determined as a function of a load signal and the rpm of the engine and as a function of the difference between the desired diagnosis value to be attained and the actual sensor voltage.

According to a concomitant mode of the method, it further includes the step of switching over to increase the measurement accuracy in evaluating the sensor signal in an electronic control unit at the onset of monitoring from an operating resistance present in the control range of the lambda sensor to a higher-impedance diagnostic resistance.

Other features which are considered as characteristic for the invention are set forth in the appended claims.

Although the invention is illustrated and described herein as embodied in a method for monitoring the functional capability of an exhaust gas sensor-heater, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
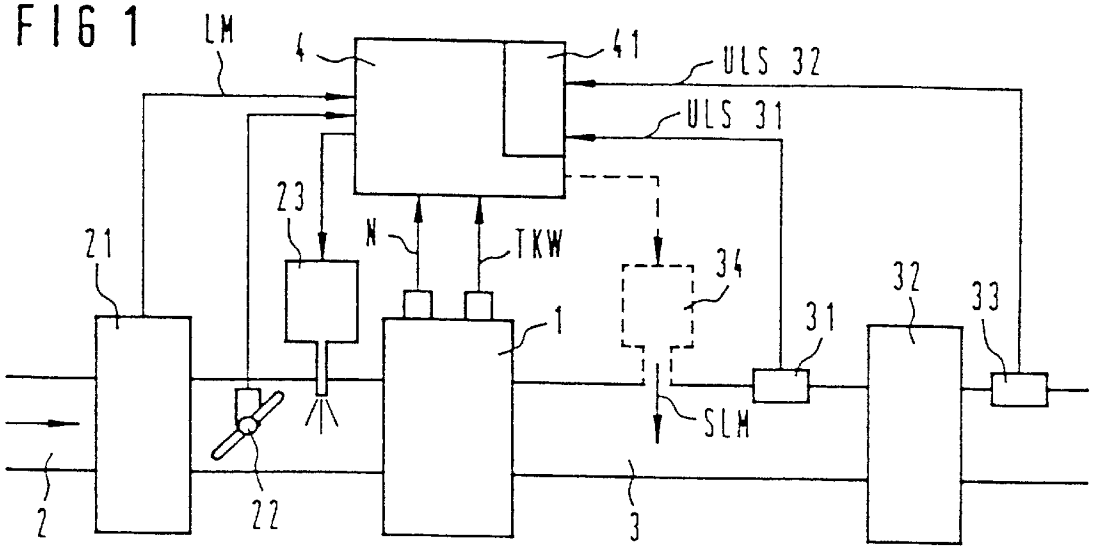
FIG. 1 shows a simplified block circuit diagram of an internal combustion engine in which the method of the invention is employed.

Referring now to the figures of the drawings in detail and first, particularly, to FIG. 1 thereof, there is seen a block circuit diagram which shows an engine block 1 of an internal combustion engine, with an intake pipe 2 and an exhaust pipe 3 connected to it. An air flow rate meter 21, which outputs an output signal corresponding to the aspirated air mass LM, is disposed in the intake pipe 2. A throttle valve 22 also present in the intake pipe 2 serves to control the air intake. It is assigned a throttle valve block 24, whose output signal contains information about the position of the throttle valve, such as its opening angle, and is delivered for further processing to an electronic control unit 4. Upstream of a three-way catalyst 32, located in the exhaust pipe 3 and serving to convert the harmful pollutants $NO_x$, HC, and CO, is a first lambda sensor 31, and a second lambda sensor 33 provided downstream of the catalyst 32. The two lambda sensors 31, 33 are provided with an electric heater, known per se, and they have a two-point characteristic; that is, they can detect only a mixture that is leaner or richer than the stoichiometric ratio (lambda=1). The output signals ULS31, ULS33 of the two lambda sensors 31, 33, like the signal LM of the air flow rate meter 21, and the signals for rpm N and coolant temperature TKW of the engine, received via corresponding transducers, are supplied to the electronic control unit 4.

The output signal of the lambda sensor 31 upstream of the catalyst 32 serves in the conventional way as an input variable for a lambda control unit 41, contained in the electronic control unit 4; the lambda control unit 41 adjusts the air/fuel mixture, to be supplied to the engine combustion chambers, to an optimal value as a function of the engine operating point.

The output signal of the lambda sensor 33 that is disposed downstream of the catalyst 32 is used in combination with the output signal of the lambda sensor upstream of the catalyst 32 for monitoring the catalyst 32 efficiency. If the catalyst 32 has good conversion capabilities, the lambda fluctuations generated by the lambda controller of the lambda control unit 41 are smoothed by the oxygen storage capability of the catalyst 32. If aging, poisoning from the use of leaded fuel or combustion misfires causes the catalyst 32 to have only diminished conversion properties or none at all, then the lambda fluctuations upstream of the catalyst 32 also appear downstream of the catalyst 32. These lambda fluctuations are detected with the aid of the lambda sensor 33 and are further processed in the electronic control unit 4 to make a statement about the efficiency of the catalyst 32.

On the output side, the electronic control unit 4 communicates via appropriate interfaces with, among others, an injection system 23, which—as merely suggested in FIG. 1—injects fuel via injection valves into the intake pipe 3. The base quantity of fuel to be injected is determined by a program routine on the basis of the aspirated air mass LM and the rpm N, and the value thus obtained is weighted with various correction factors, so that the various operating states of the engine (warmup, acceleration, full load, etc.), are taken into account.

Since the output signals of the two lambda sensors 31, 33 depend not only on the residual oxygen content in the exhaust gas but also on the temperature of the respective sensor layer, the lambda sensors 31, 33 have heaters, not identified by reference numeral, in the form of electric resistance paths. As a result, in addition to rapid operational readiness of the sensors, the necessary constant temperature during closed-loop control operation for accurate evaluation of the signals is also adhered to. For controlling the heaters, a lambda sensor heating controller, known per se, is used; it outputs a pulse width modulated (PWM) signal to the heater.

The heater is monitored at regular time intervals. This can be done for instance in the context of a test cycle, which is either composed of speed curves that have been actually measured in road traffic (FTP72 test), or from a synthetically generated driving curve that is a good approximation of driving performance in in-town traffic (ECE/EG test cycle). Since for diagnosis of the heater the temperature-dependent behavior of the lean voltage of the lambda sensor is evaluated, it must be assured from the outset of diagnosis that the lambda sensor to be monitored is indicating a lean mixture. One such engine operating range is overrunning shutoff. Heater monitoring is therefore preferably done during adequately long phases of engine overrunning shutoff.

Figure 2:
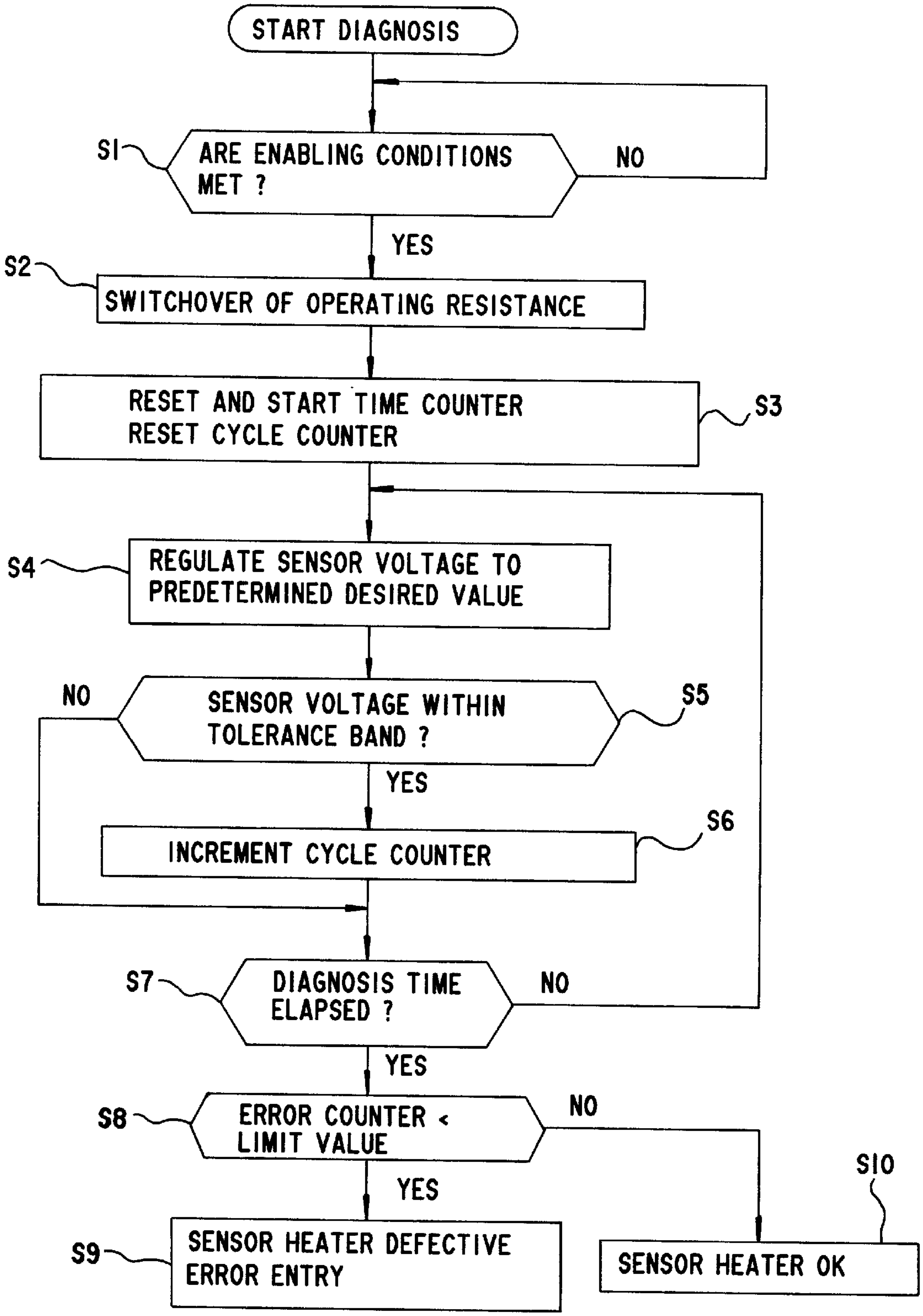
FIG. 2 is a flow chart that shows the course of the method.

The course of the method for monitoring the lambda sensor heater will be explained for the lambda sensor 33 disposed downstream of the catalyst 32 with the aid of the flow chart of FIG. 2 and the voltage and time graph of FIG. 3. The monitoring of the heater of the lambda sensor 31 upstream of the catalyst 32 can be done analogously. For this reason, for the sake of simplification, the abbreviation ULS will be used as a reference symbol for the sensor signal of both lambda sensors 31, 33.

It is also assumed that the lambda sensor under observation outputs a high voltage (typically 5 V) when there is a lean mixture composition and a low voltage (typically 100 mV) when there is a rich mixture composition.

In a first step S1, it is checked whether certain enabling conditions for the diagnosis of the heater are met. Specifically, the questions are asked whether the engine is in the operating state of overrunning shutoff SA and the output signal ULS of the lambda sensor to be monitored is indicating a lean mixture composition for a predetermined time period T_ULS_LEAN; that is, it is checked whether the output signal ULS during this period is above the threshold value ULS_LEAN for detecting lean operation (FIG. 3, times t1–t2). The operating state of overrunning shutoff SA can for instance be detected by querying the throttle valve position and the engine rpm and then linking these measured variables.

Figure 3:
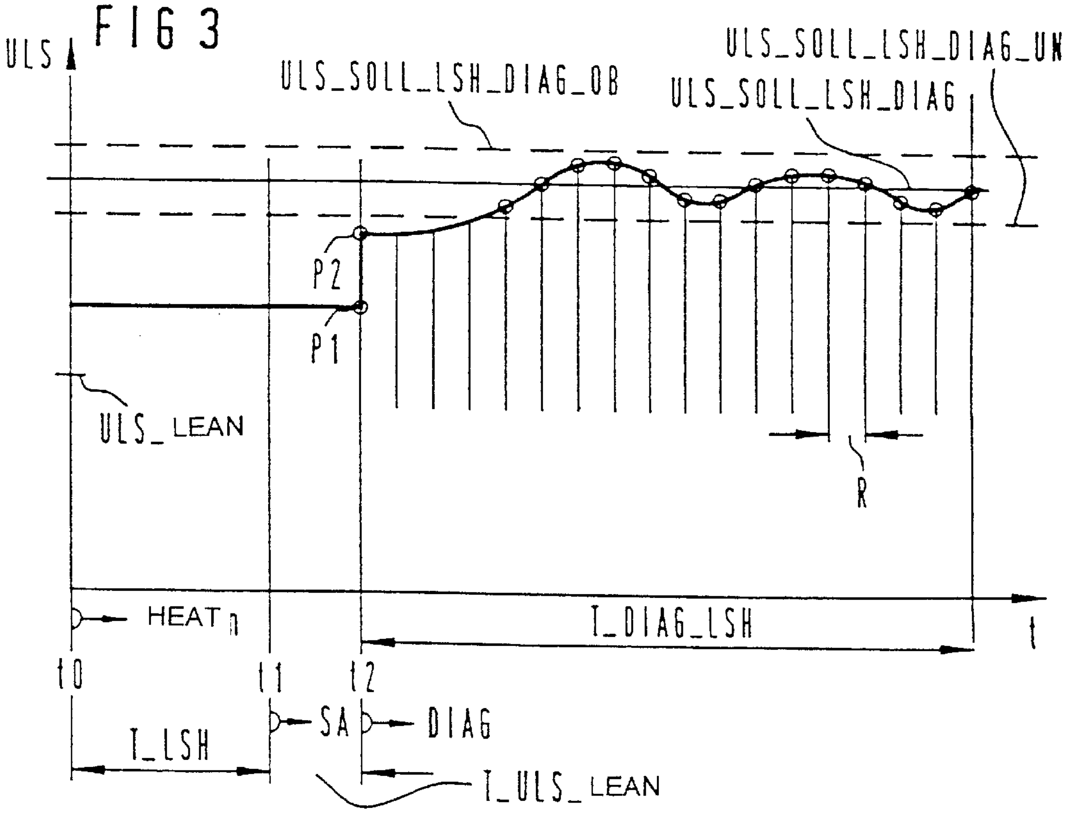
FIG. 3 shows the qualitative course of the sensor output signal as a function of time during the monitoring.

It is also checked whether the temperature of the lambda sensor is within the temperature range suitable for the monitoring, and whether the time T_LSH for heating the lambda sensor has elapsed (FIG. 3, times t0–t1). Moreover, the diagnosis is not enabled if an error entry for triggering the end stage for the heater is already present in an error memory of the control unit 4.

If all the above conditions are met, then the method is continued with step S2; otherwise, the conditions are queried again in a waiting loop.

To achieve higher measurement accuracy in evaluating the change in the output signal caused by the effective temperature, or in other words in the lean voltage of the lambda sensor, a switchover is made (step S2) at the onset of diagnosis (t2) in the electronic control unit 4 from an operating resistance (typically 30 k) used in the control range of the lambda sensor to a higher diagnostic resistance (typically 100 k). By this switchover, the sensor voltage ULS to be evaluated is raised, from a level P1 shown in FIG. 3 to a level P2.

With the onset of diagnosis DIAG (t2), a time counter for the maximum allowable diagnosis time T_DIAG_LSH is first reset and then started. A cycle counter ZYKA_LSH is also reset (step S3). In step S4, the sensor voltage ULS is regulated to a predeterminable diagnostic desired value ULS_SOLL_LSH_DIAG. To that end, to trigger the lambda sensor heater, a pilot control duty cycle KF_TALSH_i is read out of a performance graph, spanning the air mass IM and the rpm N, in a memory of the control unit 4 and corrected with a factor TALSH_FAK_i of the lambda heating controller (I controller):

TALSH_=KF_TALSH_* TALSH_FAK_. (1)

The controller value TALSH_FAK is initialized with 1 at the outset of diagnosis, and in normal operation or in other words in lambda control operation of the engine, it has no influence on the calculation of the injection time.

The controller input variable for the heating controller is the difference between the desired voltage (diagnostic desired voltage) to be attained, ULS_SOLL_LSH_DIAG and the actual sensor voltage ULS:

ULS_DIF=ULS_SOLL_LSH_DIAG−ULS (2)

A table is stored in a memory of the electronic control unit 4; in it, as a function of the difference ULS_DIF ascertained by equation (2), associated values for the duty cycle TAB_TALSH_DIF are stored in memory.

The I components of the heating controller TALSH_FAK in equation (1) are then calculated as a function of the sign of the difference between the desired voltage to be attained, which is ULS SOLL_LSH_DIAG, and the actual sensor voltage ULS.

If ULS_DIF=<0, then:

TALSH_FAK_neu=TALSH_FAK_alt+TAB_TALSH_DIF if ULS_DIF>0, then:

TALSH_FAK_neu=TALSH_FAK_alt−TAB_TALSH_DIF

During the heater diagnosis time T_DIAG_LSH, the sensor signal ULS is monitored in a predeterminable sampling pattern R (for instance, every 20 ms). To that end, in step S5, the question is asked whether the value ULS is within a tolerance band around the desired diagnosis value ULS_SOLL_LSH_DIAG. In FIG. 3, these thresholds are shown as ULS_SOLL_LSH_DIAG_UN for the lower threshold and ULS_SOLL_LSH_DIAG_OB for the upper threshold. On each monitoring that produces a value within these thresholds, the cycle counter ZYKA_LSH is incremented in step S6. If the time for diagnosis has elapsed (query in step S7), then the contents of the cycle counter ZYKA_LSH are compared in step S8 with an applicable limit value ANZ_MIN_LSH. If the number of cycles in which the sensor voltage ULS is within the predetermined limit values is less than the limit value ANZ_MIN_LSH, that is,

ZYKA_LSH<ANZ_MIN_LSH, then the heater of the lambda sensor is found to be defective, and an error is entered in an error memory, since the heating output is not within the prescribed range (step S9). At the same time, the outcome of the diagnosis can be reported to the vehicle driver acoustically and/or visually.

If the answer to the question in step S8 is negative, then the heater is functioning properly as shown at step S10.

The method has been described in terms of an exemplary embodiment in which the monitoring of the heater is done during the overrunning shutoff. However, it is also possible to perform the monitoring during some other engine operating state, in which the sensor output by the lambda sensor to be monitored detects a lean mixture composition, such as during secondary air injection. During the warmup phase that follows the starting phase, secondary air is blown by a blower, the so-called secondary air pump, into the exhaust pipe, downstream of the engine outlet valves in the terms of the flow direction of the exhaust gas. As a result, the lambda sensor detects an air excess. The reaction of the air, supplied in this way, with the hot exhaust gases and the further oxidation in the catalyst lead to rapid heating of the catalyst.

FIG. 1 in dashed lines shows an electrically driven secondary air pump 34, which is triggered via an output of the electronic control unit 4 and blows a certain secondary air quantity SLM into the exhaust tract at a point upstream of the lambda sensor 31. The monitoring of the heater of the lambda sensors during the secondary air injection is done analogously to the method described, with the exception that different turn-on conditions, in accordance with this kind of operating mode of the engine, must be queried (such as monitoring whether the secondary air injection is active).

We claim:

1. A method for monitoring functional capability of a lambda sensor, heatable by a heater, for an internal combustion engine by evaluating a sensor signal output by the lambda sensor, comprising the steps of:

ascertaining an engine operating state in which it is assured that the lambda sensor will detect a lean mixture;

detecting a sensor voltage output in that state, regulating by varying the heating output by means of the heater of the lambda sensor, the sensor voltage to a predetermined desired diagnosis value; and classifying the heater of the lambda sensor as being defective if the sensor voltage after a predetermined diagnosis time is not within a tolerance range located around a desired diagnosis value.

2. The method according to claim 1, which further comprises the step of:

ascertaining as the operating state, an overrunning shutoff phase of the engine.

3. The method of claim 1, which further comprises the step of:

ascertaining as the operating state, a secondary air injection into an exhaust pipe of the engine.

4. The method according to claim 1, which further comprises the step of sampling continuously within the diagnosis time, the sensor voltage of the lambda sensor in a selectable sampling pattern, and classifying the heater of the lambda sensor as defective if fewer than a predeterminable number of samplings furnish a value that is within the tolerance range.

5. The method according to claim 1, which further comprises the step of:

not-enabling the monitoring until the exhaust sensor detects a lean mixture composition for at least a predetermined period of time.

6. The method according to claim 1, which further comprises the step of:

not-enabling the monitoring until the temperature of the exhaust sensor is within a predetermined temperature range.

7. The method according to claim 1, which further comprises the step of:

effecting the regulation of the sensor voltage to the desired diagnosis value by means of a heating controller that outputs a pulse width modulated signal, whose duty cycle is determined as a function of a load signal and the rpm of the engine and as a function of the difference between the desired diagnosis value to be attained and the actual sensor voltage.

8. The method according to claim 1, which further comprises the step of:

switching over to increase the measurement accuracy in evaluating the sensor signal in an electronic control unit at the onset of monitoring from an operating resistance present in the control range of the lambda sensor to a higher-impedance diagnostic resistance.

* * * * *